US007587766B2

(12) United States Patent
Greene et al.

(10) Patent No.: US 7,587,766 B2
(45) Date of Patent: Sep. 8, 2009

(54) FLEXIBLE DIGITAL CONTENT LICENSING

(75) Inventors: Bob Greene, Lone Tree, CO (US); John C. Beyler, Highlands Ranch, CO (US); Rebecca R. Lim, Englewood, CO (US); John S. Fukuda, Denver, CO (US)

(73) Assignee: Starz Entertainment Group LLC, Englewood, CO (US)

( * ) Notice: Subject to any disclaimer, the term of this patent is extended or adjusted under 35 U.S.C. 154(b) by 804 days.

(21) Appl. No.: 10/993,140

(22) Filed: Nov. 18, 2004

(65) Prior Publication Data

US 2006/0167808 A1 Jul. 27, 2006

(51) Int. Cl.
*H04N 7/16* (2006.01)

(52) U.S. Cl. ............................ 726/27; 726/31; 380/231

(58) Field of Classification Search ................... 736/27; 726/27

See application file for complete search history.

(56) References Cited

U.S. PATENT DOCUMENTS 4,381,556 A * 4/1983 Bourdon et al. .......... 369/44.14
5,594,794 A * 1/1997 Eyer et al. .................. 380/231
6,665,303 B1 * 12/2003 Saito et al. .................. 370/401
2004/0162846 A1 * 8/2004 Nakahara et al. ............ 707/102
2004/0220926 A1 * 11/2004 Lamkin et al. ................. 707/3
2005/0022019 A1 * 1/2005 Medvinsky et al. ......... 713/201

FOREIGN PATENT DOCUMENTS

JP 2004234272 A * 8/2004

* cited by examiner

*Primary Examiner*—Nasser G Moazzami
*Assistant Examiner*—Michael S McNally
(74) *Attorney, Agent, or Firm*—Townsend and Townsend and Crew LLP

(57) ABSTRACT

According to the invention, a video system for playing licensed video content is disclosed. The video system includes a video, a video selection interface, a video storage device, and a license control process. The video is selected from a plurality of videos stored on the video storage device. There is a plurality of content licenses for the video, where the plurality of content licenses is comprised of at least a first content license and a second content license. The first content license has a first time period where viewing is allowed and the second content license has a second time period where viewing is allowed, where the first time period is different from the second time period. The license control process enforces the content licenses.

22 Claims, 11 Drawing Sheets

FLEXIBLE DIGITAL CONTENT LICENSING

This application incorporates by reference U.S. patent application Ser. No. 60/523,250 filed on Nov. 18, 2003, and U.S. patent application Ser. No. 10/824,625 filed on Apr. 13, 2004 in their entirety for all purposes.

BACKGROUND OF THE DISCLOSURE

This disclosure relates in general to video services and, more specifically, but not by way of limitation, to video on demand type services.

Users have the ability to enjoy pay per view videos through their cable system, VDSL, satellite, or download service. The video content is licensed to the user with specific controls on that use. For example, the user can view the video an unlimited number of times on a particular player in a 24 hour window. Once the window has expired, the user can order and pay for the video again.

The traditional business models for video delivery are changing away from the various broadcast models. Movies can be downloaded and shows are broadcast over the Internet. There are subscription DVD services allow receiving movies in the mail without ever visiting a video store. As delivery of video content evolves so does the mechanics of content licensing.

BRIEF DESCRIPTION OF THE DRAWINGS

The present disclosure is described in conjunction with the appended figures.

Figure 1A:
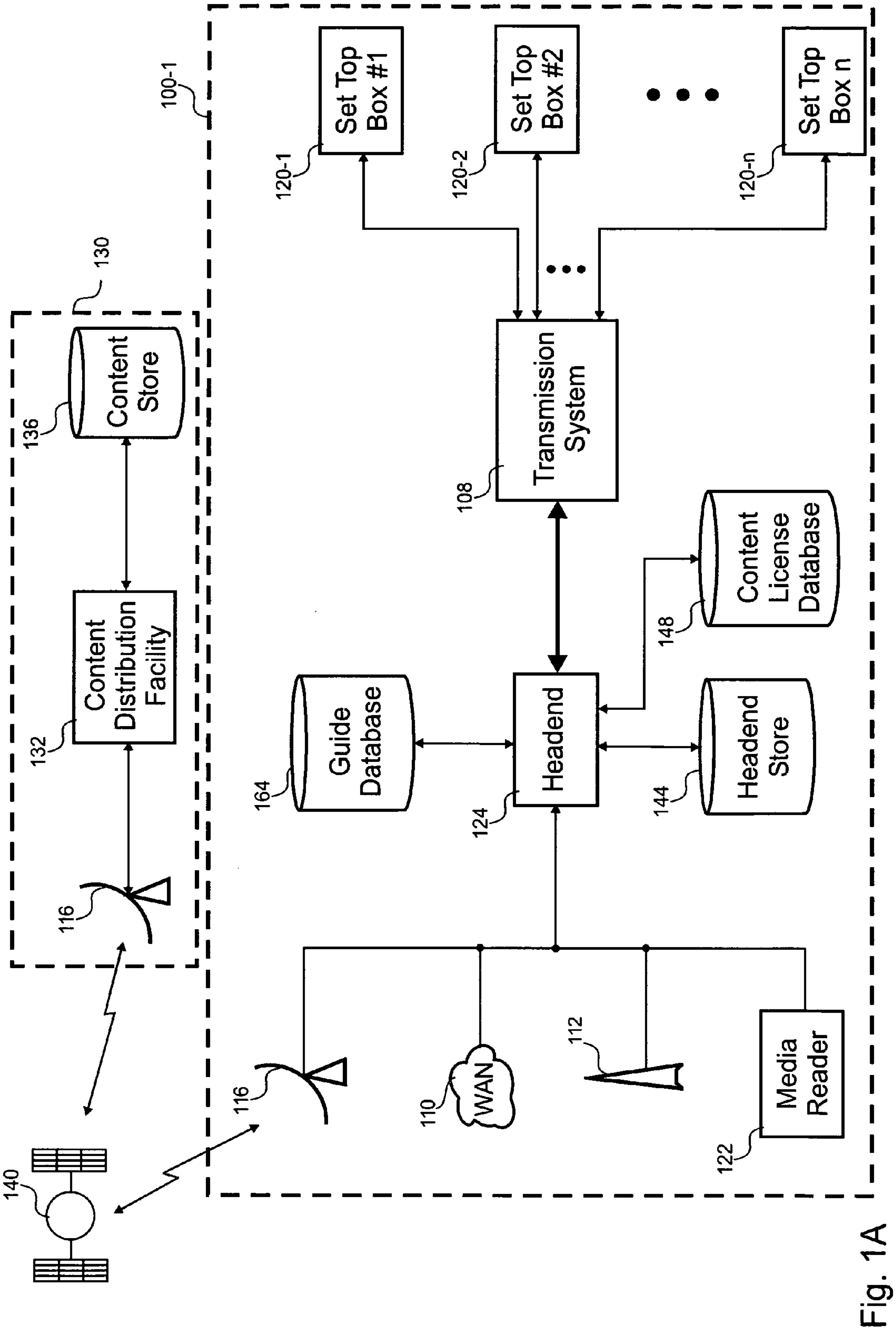
FIGS. 1A, 1B, 1C, 1D, and 1E are block diagrams that show embodiments of a program delivery system.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE PREFERRED EMBODIMENT

The ensuing description provides preferred exemplary embodiment(s) only, and is not intended to limit the scope, applicability or configuration of the invention. Rather, the ensuing description of the preferred exemplary embodiment (s) will provide those skilled in the art with an enabling description for implementing a preferred exemplary embodiment of the invention. It being understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments maybe practiced without these specific details. For example, circuits may be shown in block diagrams in order not to obscure the embodiments in unnecessary detail. In other instances, well-known algorithms, processes, structures and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" includes, but is not limited to portable or fixed storage devices, optical storage devices and various other mediums capable of storing data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Referring first to FIG. 1A, a block diagram is shown of an embodiment of a program delivery system 100-1 in satellite communication with a content provider 130. This embodiment only depicts one content provider 130, but typically there are many content providers 130. The program delivery system 100-1 takes the content from a number of content providers 130 and delivers the content to set top boxes 120 or other content receivers in a broadcast or multicast fashion. The users with the set top boxes 120 are billed by the program delivery system 100-1 in a variety of ways. The content could be pay per view, streamed, purchased, downloaded, and/or part of a subscription.

The depicted content provider 130 communicates via a satellite 140 with the program delivery system 100-1. Other embodiments could have content providers 130 that could also use a wide area network 110, a terrestrial antenna 112, a media reader 122, and/or other distribution techniques to forward the content objects. The wide area network 110 could be a private or public network. Distribution on a public network, such as the Internet, could be protected by encryption, Digital Rights Management (DRM) and/or virtual private network (VPN) techniques. The terrestrial antennae 112 could accept content broadcast by local stations, sent by microwave link, or other wireless techniques. Any type of portable media could be read by various embodiments of the media reader 122. For example, a media reader 122 could input content from magnetic tape, film, optical disk, flash drives, hard drives, magnetic disks, holographic media, etc.

This embodiment of the content provider 130 includes a satellite dish 116, a content distribution facility 132 and a content store 136. The satellite dish 116 is used to connect via the satellite 140 to another satellite dish 116 of the program delivery system 100-1. Some embodiments could have a number of program delivery systems 100 that communicate with the content provider 130 to receive programs for geographically disparate set top boxes 120. The content store 136 is used to hold programs on tapes, optical drives, magnetic drives, film, flash media, and/or other storage mediums. The content distribution facility 132 retrieves, edits, formats, and transmits the content. Program guide information, program schedule, promotional audio and/or video is also forwarded by the content distribution facility 132 and stored in a guide database 164 for use in populating navigation menus displayed on a set top box 120 or other computing device.

The program delivery system 100-1 delivers the programs from various content providers 130 to the set top boxes 120 or content receivers of the users. Many different topologies are used to deliver the programs. A transmission system 108 is a mix of fiber, coaxial cable, microwave datalink, twisted pair, and/or wireless that is used to distribute the content to set top boxes 120. Neighborhood nodes or hubs could be included in the transmission system 108. The transmission could be circuit switched and/or packet switched using unicast point-to-point and/or multicast. Two-way communication between the headend 124 and set top boxes 120 is performed in an online or offline fashion in various embodiments.

Some programs are relayed in real-time as they are received by the program delivery system 100, while others are stored in a headend store 144 for later delivery. For example, a local network channel could be received on the terrestrial antennae 112 and coupled to the transmission system 108 for immediate delivery to the set top boxes 120 according to a linear schedule detailed in the guide database 164.

Some programs could be held in the headend store 144 for viewing in a linear schedule, on demand and/or as a club program. A subscribed service, for example subscription video on demand (SVOD), provides club programs to subscribers with VOD control of playback. A number of club programs are provided to the club subscribers without requiring paying for each one. The programs could be video on demand (VOD), SVOD club programs, network-based personal video recorder (PVR), locally stored on a PVR, and/or downloaded programs.

The guide database 164 has program descriptions, ratings, advertisements, schedule times, pricing, usage limits and promotional video and/or audio for the content available to the program delivery system 100. The guide database 164 could be populated by the content provider 130 and/or a third party that gathers this type of information. Some embodiments could download relevant portions of the guide database 164 to each set top box 120 for browsing and/or made available to content receivers from a web browser or application interface.

Programs could be selected for recording from the guide and subscriptions could be ordered through the web site, by phone or by mail. One embodiment could formulate the guide screens with information from the guide database 164 for unicast to a particular content receiver. Program information for on demand offerings is also included in the guide database 164. In some embodiments, the user allowed to watch an on-demand program during a time window. The guide database 164 could store time window information. Where a particular program is available in the linear schedule and on demand, the guide database 164 could be updated such that this is reflected on the menus for users who have these two formats available.

A content license database 148 is maintained by the program delivery system 100. The licenses could be maintained for each user and/or account or could be maintained according to tiers. In one embodiment, licenses are tracked by the user or account, where embodiments that don't track users individually are tracked at the account level. The program delivery system 100 tracks which licenses are sent to various accounts. Some embodiments may get reports back from the content receivers to know which licenses are used. Other embodiments rely upon the content receiver to manage compliance with the license(s).

As shown in TABLE I, there are a number of parameters defined for each program and account. An account may be owned by an individual, a business and/or a location. The table is somewhat simplified as an account would typically include access to many more programs. One or more licenses are associated with each program. A license can have up to two timing components in this embodiment, namely, a length of the license measured from when viewing begins and a license window that begins when the program becomes available. For example, John Doe can watch the Portland Show at any time in the future, but before Dec. 1, 2004. Once John Doe begins to watch the Portland Show, he can no longer watch after 24 hours has elapsed.

This embodiment, tracks usage in the content license database 148. Content receivers may report usage in real time or periodically. In some cases, reporting back is not supported by some content receivers and the content license database 148 can indicate the same. During the License Length, some embodiments limit the number of views, allow unlimited views, and/or limit the number of unique viewers. Some embodiments allow the license to be used on one content receiver, a defined group of content receivers, all content receivers associated with an account, a number of content receiver, or an unlimited number of content receivers. Concurrent views may or may not be prohibited.

Some programs have a number of licenses available to the account. The licenses could have the same or different window and could have the same or different license length. For example, John Doe has started use of one 72 hour license of the Wild River Movie where the viewing window expires on Dec. 1, 2004. After expiration of the license length or window, additional licenses could be available and used. For example, if the first license's 72 hour period expires on Nov. 20, 2004, there are three more licenses that can be used until their window expires. The content license database 148 and/or the content receiver can track where viewing ended and the new license can be activated at that point. A message may be presented when switching to a new license. Some embodiments ask for a confirmation by a button press or otherwise when switching licenses.

Some embodiments divide a program and provide separate licenses for the portions. Some portions could have more than one license. For example, a first member of the Joe Smith Residence has used a first license for the beginning third of the Big Tree Movie. After the first license expires, a second member may watch the beginning third a few days later. Once caught up, both the first and second members can watch the remaining two thirds by using the remaining licenses. The licenses could be divided among fractions of the program (e.g., fifths, quarters, thirds, halves, etc.) or could be divided by time period (e.g., 15 minute, 30 minute, hour segments, etc.).

Some embodiments could have a number of licenses that can be used on any fraction of the program. Each license could be used for any portion of the program. For example, five licenses could be used for viewing the first quarter of the program on five different days. In another example, any thirty minute period of the movie could be watched with a license.

One embodiment ties the license to a recurring time-of-day. The window could be evenings, mornings, daytime, early morning, late night, a time range, etc. This window could be tied to another expiration window such as a future date, a month, a week, etc. For example, an adult themed movie could be available for 5 hours any late night time (i.e., after 10 p.m.) this month.

TABLE I

License Database Excerpt

| Account | Program | License(s) Length | In Use | Window |
|---|---|---|---|---|
| John Doe | Portland Show | 24 hour license for whole program | No | Expires Dec. 01, 2004 |
| | Wild River Movie | 72 hour license for whole program | Yes | Expires Dec. 01, 2004 |
| | | 24 hour license for whole program | No | Expires Dec. 15, 2004 |
| | | 24 hour license for whole program | No | Expires Dec. 15, 2004 |
| | | 72 hour license for whole program | No | Expires Jan. 01, 2005 |
| Jane Roe | Big Tree Movie | 5 hour license for whole program | No | No expiration |
| ACME Bar | Boxing Night | 2 hour license for first fight | Yes | Expires at midnight |
| | Boxing Night | 2 hour license for second fight | No | Expires at midnight |
| | Political Debate | License for whole window for whole program | No | Expires Dec. 01, 2004 |
| Joe Smith Residence | Big Tree Movie | 24 hour license for first third of movie | Yes | Expires Dec. 15, 2004 |
| | | 24 hour license for first third of movie | No | Expires Dec. 15, 2004 |
| | | 24 hour license for second third of movie | Yes | Expires Dec. 15, 2004 |
| | | 24 hour license for third third of movie | No | Expires Dec. 15, 2004 |

Where licenses are controlled by tier, each subscriber to that tier receives the same licenses. An example of the contents of content license database for a tiered system are depicted in TABLE II. The content receiver manages viewing to assure the use doesn't exceed that permitted in the tier. Some embodiments could have both tiered license controls and individual license controls. One embodiment has tiers with the same or partially overlapping programs, but has different license lengths and windows. For example, a basic tier may have a two hour license length for a two hour show, but a premium tier may have a 72 hour license length. Other embodiments could have varying window sizes for the same content in different tiers.

TABLE II

Tiered License Database

| Tier | Program | License(s) Length | Window |
|---|---|---|---|
| Basic | Portland Show | 24 hour license for whole program | Expires Dec. 01, 2004 |
| Premium | Big Tree Movie | 5 hour license for whole program | No expiration |
| | Wild River Movie | 72 hour license for whole program | Expires Dec. 01, 2004 |
| | | 24 hour license for whole program | Expires Dec. 15, 2004 |
| | | 24 hour license for whole program | Expires Dec. 15, 2004 |
| Sports | Boxing Night | 2 hour license for first fight | Expires at midnight |
| | Boxing Night | 2 hour license for second fight | Expires at midnight |
| | Denver Marathon | License for whole window for whole program | Expired at noon |
| Politics | Political Debate | 24 hour license for first third | Expires Dec. 15, 2004 |
| | | 24 hour license for first third | Expires Dec. 15, 2004 |
| | | 24 hour license for second third | Expires Dec. 15, 2004 |
| | | 24 hour license for third third | Expires Dec. 15, 2004 |

Figure 1B:
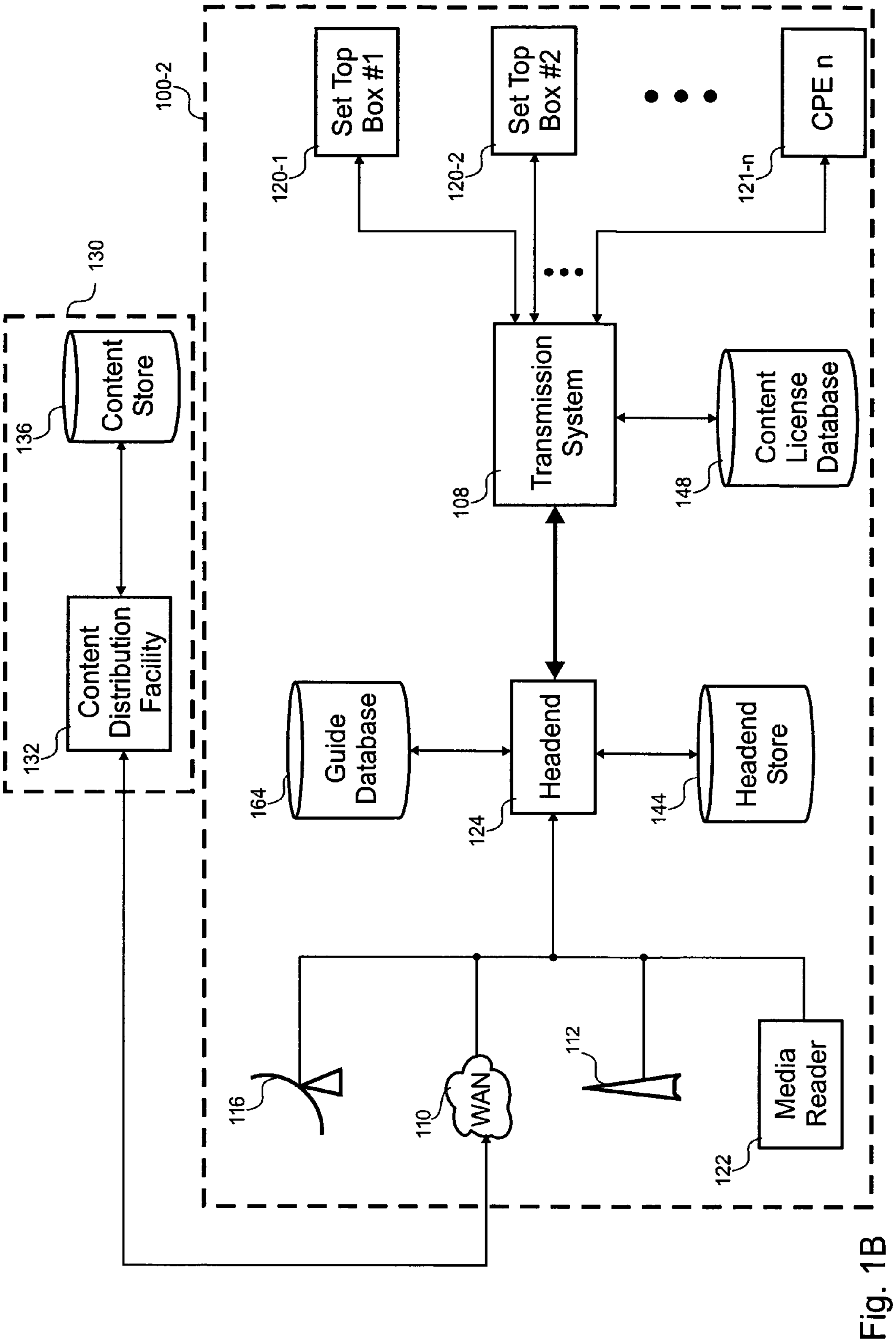

With reference to FIG. 1B, a block diagram is shown of another embodiment of a program delivery system 100-2 in wide area network (WAN) communication with a content provider 130. In this embodiment, the content provider 130 uses a private or public WAN 110 to send content and guide information to the program delivery system. A public WAN, e.g., the Internet, could use encryption, Digital Rights Management (DRM) and/or VPN techniques to protect the content. In some embodiments, the content provider 130 may use a number of different techniques to distribute content to one or more program delivery systems 100.

In this embodiment, the content license database 148 is away from the headend 124, but coupled to the transmission system 108 the coupling could be direct or virtual by using a WAN. In other embodiments, the content license database 148 could be distributed among the content providers 130 or distributed in any other manner. In some embodiments, there are multiple content license databases 148 that may each have a subset of licenses or could have overlapping data that is kept coherent. For example, a content receiver may store some licenses that are reconciled with a remote content license database 148.

There are different types of content receivers possible in various embodiments. Any device that can play video content and manage content licenses is a possible content receiver. This embodiment has set top boxes 120 and customer premises equipment (CPE) 121. The CPE could include any number of content receivers of any number of configurations.

Figure 1C:
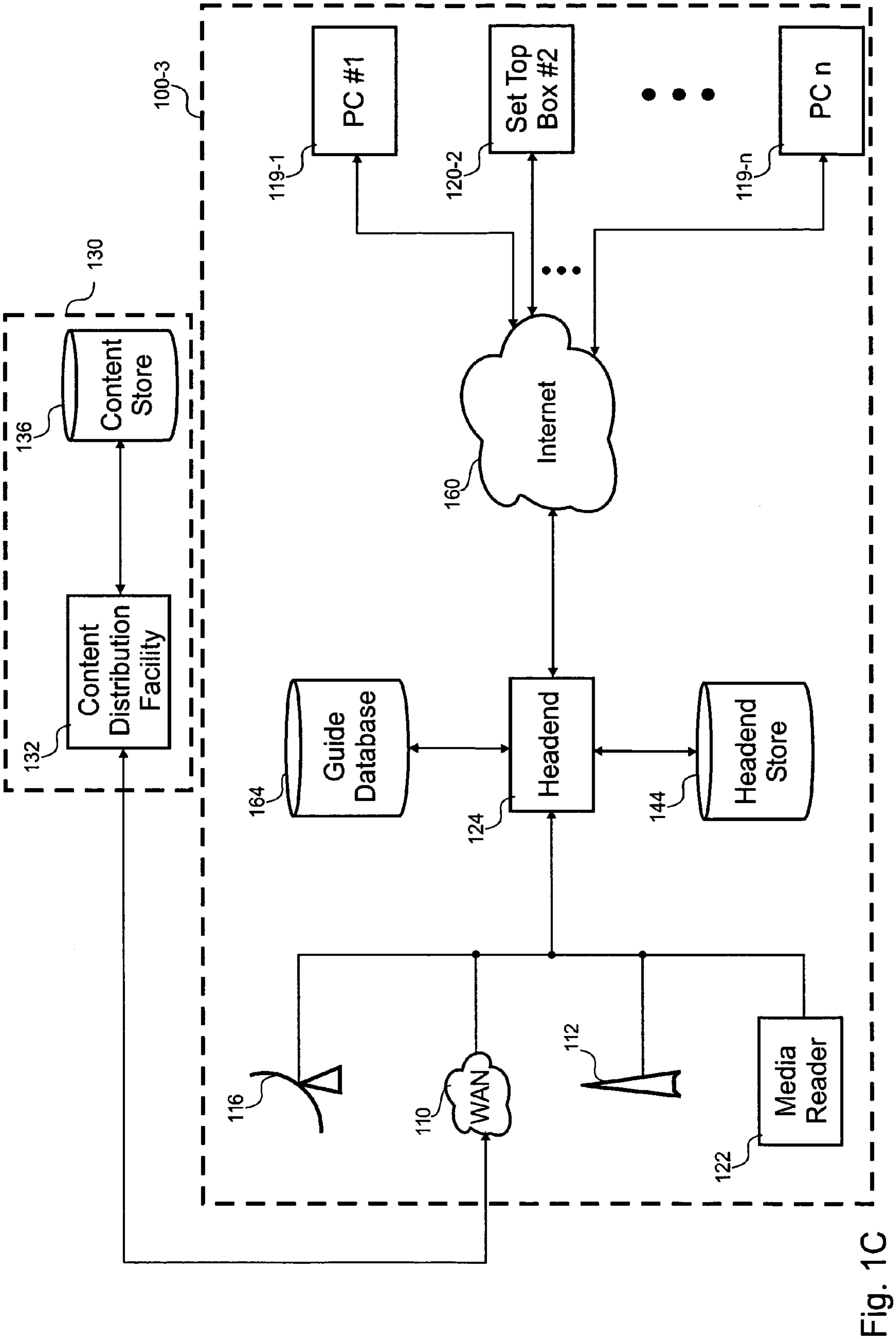

Referring next to FIG. 1C, a block diagram is shown of yet another embodiment of a program delivery system 100-3 in wide area network (WAN) communication with a content provider 130. In this embodiment, the transmission system 108 is replaced with the Internet 160 to distribute content to set top boxes 120, CPE 121 and personal computers (PCs)

119. In this embodiment, the content license database 148 is managed by the content provider 130 and communicates with the various content receivers who each maintain the licenses available to the account(s) the content receiver is associated with.

Figure 1D:
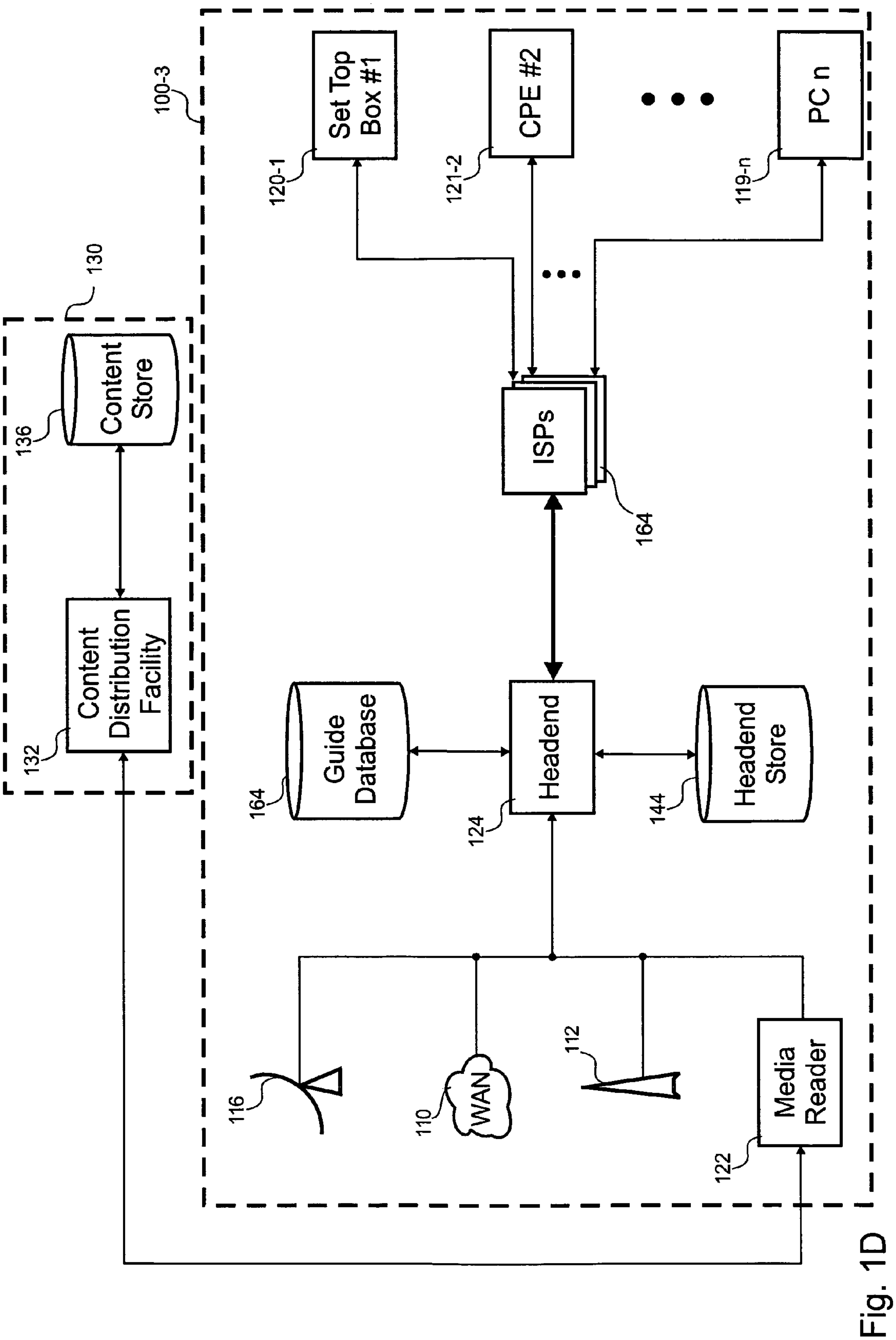

With reference to FIG. 1D, a block diagram is shown of yet another embodiment of a program delivery system 100-4. In this embodiment, the content provider 130 sends portable media for loading into the program delivery system 100-4 with a media reader 122. In this embodiment, the headend 124 is linked with a secure or private connection to a number Internet service providers (ISPs) 164 that distribute the content to the content receivers coupled to the ISP 164. With this topology, the content can be distributed with packet switched networks that are not part of the Internet.

Figure 1E:
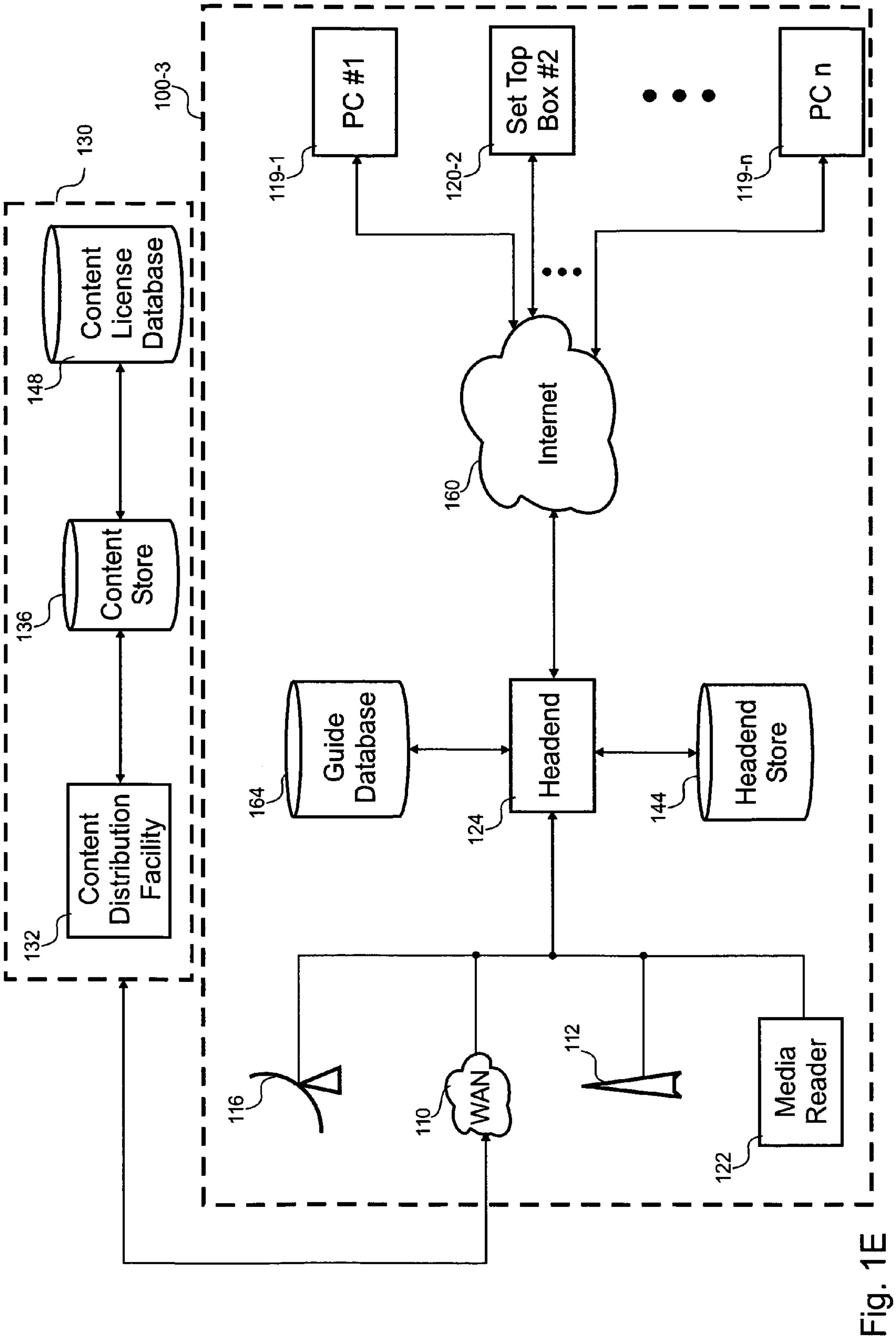

Referring next to FIG. 1E, a block diagram is shown of still another embodiment of a program delivery system 100-3 in wide area network (WAN) communication with a content provider 130. In this embodiment, the content provider maintains the content license database 148, which may be somewhat redundant with other license databases in the program delivery system 100-5 or content receivers. Various license databases could be periodically reconciled to provide coherency. In one embodiment, the licenses are distributed directly from the content provider 130 to the content receivers. As those licenses are used, accounting of that use could be directly or indirectly made back to the content provider.

Figure 2A:
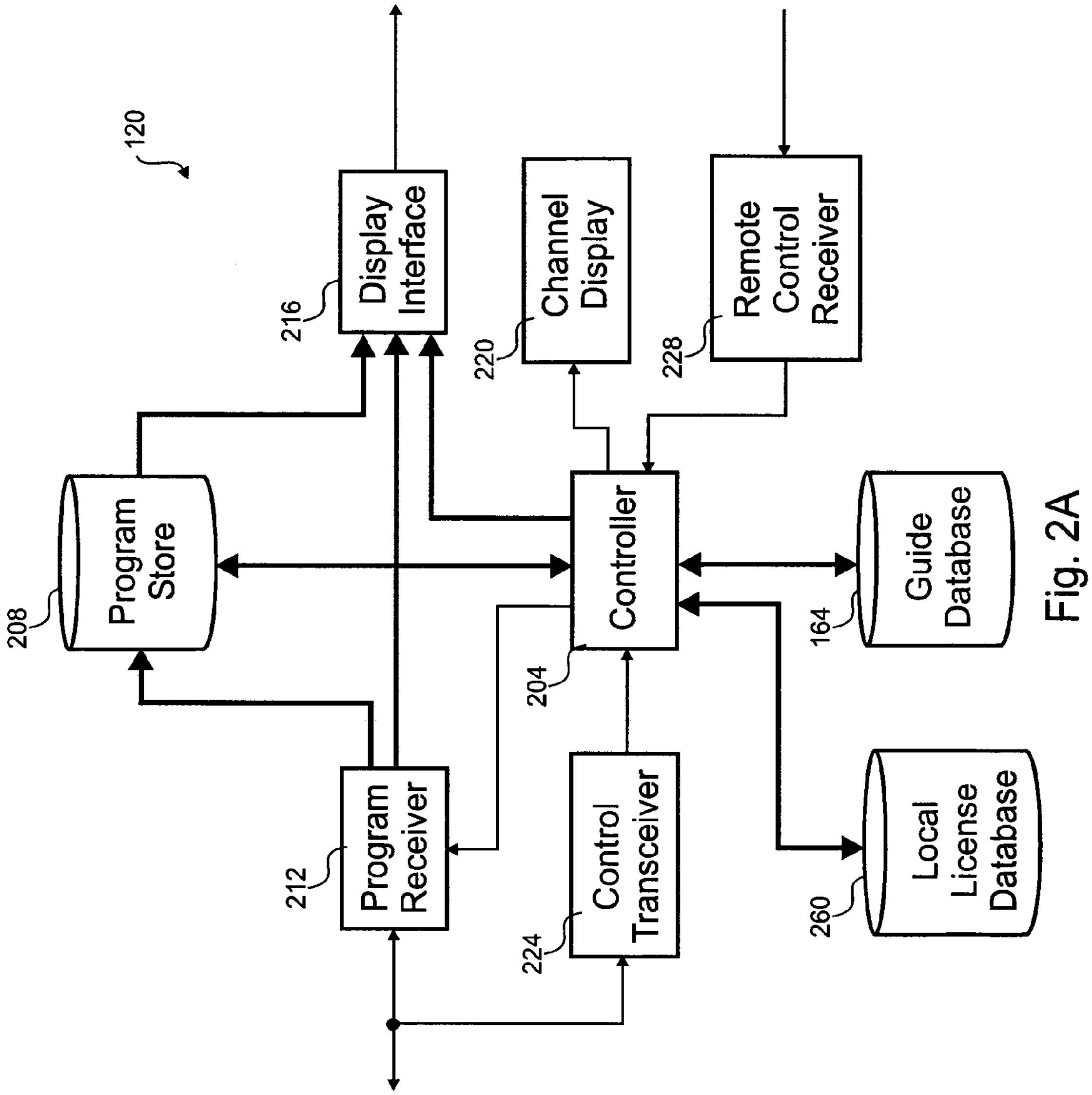
FIGS. 2A, 2B, 2C, 2D, and 2E are block diagrams illustrating embodiments of various content receivers and content receiving systems.

Referring next to FIG. 2A, a block diagram illustrating an embodiment of a set top box 120 that stores guide information, programs and licenses locally is shown. This embodiment receives content and control information over a common conduit, such as an optical fiber, VDSL system, satellite link, and/or coaxial cable. The set top box 120 in this embodiment has a hard drive or other storage medium, such as an optical disk, flash memory, SRAM, removable disk, and/or magnetic tape. Included in the set top box 120 are a controller 204, a program store 208, a program receiver 212, a display interface 216, a channel display 220, a control transceiver 224, the local license database 260, and the guide database 164. In various embodiments, the set top box 120 could be combined with other equipment such as a television, a computer, a tuner, a home gateway, a digital music player, a personal video recorder, portable media player, etc.

The program receiver 212 tunes to one or more program streams to display and/or record them. A data channel may allow downloading programs in addition to recording tuned channels. Recordings are stored in the program store 208. Playback of live or recorded programs is done by the display interface 216, which is coupled to a monitor, plasma or LCD panel, projection system, or other display. The remote control receiver 228 receives keystrokes from a remote or other input device. Although some of the embodiments discuss the use of a remote control for activating certain functions, it is to be understood that other embodiments may include alternative methods for activating those functions. For example, voice activation, among other alternatives, may be used for such activation. The channel currently being played is shown on the channel display 220, which could also appear superimposed on the display.

The control transceiver 224 receives and sends control information. Information for the guide database 164 is received by the control transceiver 224 and could be customized by the delivery system 100 for a particular set top box 120. Usage information in the local license database 260 along with billing and other information are passed by the control receiver to the network node and/or headend 124. Programs could be passed through the control channel for storage in the program store 208 in addition to passing through the more typical path of the program receiver 212. For example, a DOCSIS modem could be included that allowed for a control channel as well as downloading programs.

The program store 208 could be a video cassette recorder, a digital tape recorder, a hard drive, solid state storage, an optical drive, or other known storage media. The storage media could be removable or non-removable. The storage device could be external to the set top box 120 and coupled thereto with a dedicated cable, wireless transceiver, and/or packet switched network. In some embodiments, the program store 208 could be, for example, in a residential gateway, in another computer on the network, in a network storage device, or in a storage device peripheral coupled to the set top box 120. In one embodiment, programs are received in a compressed and/or encrypted format and stored on the program store 208. As or while the program is being played the compression and/or encryption is removed.

In one embodiment the program store is a writable disk that allows access to any program stored on the disk in less than 10, 5, 2 or 1 seconds. The viewer can select any playback point in a video and quickly get there without waiting for tape reels to find the location.

Operation of the set top box 120 is managed by the controller 204 with use of supporting software and/or hardware. The guide database 164 and local license database 260 are used by the controller 204 to present menu screens and filter licensed programs for the users of the set top box 120. License information may be included in the program guide. The controller 204 regulates use of downloaded or stored programs stored within the set top box 120.

Some embodiments of the set top box 120 customize the user interface according to the user(s) interacting with the set top box. Biometric recognition, such as face recognition, voice recognition or keystroke recognition, could be used to determine the user. Alternative embodiments could augment or replace the automatic recognition with a screen prompt or a button on the remote. A button or switch on the remote could be assigned such that each user could indicate his or her presence. Once the identity of the viewer is known, the set top box 120 is actively or passively updates the preferences for the viewer in a multiple viewer household. Different viewers could have different licenses. Some licenses could be limited to the number of viewers by detecting when too many viewers are using the license at one time. Other embodiments could merely have a single set of preferences for all possible viewers and not try to resolve the particular viewer.

The local license database 260 stores licenses relevant to the viewers or account the set top box 120 is used with. A remote content license database 148 may be coherently maintained to replicate the information in the various local license databases 260. Some embodiments do not have a remote content license database 148 and only rely upon the licenses distributed to the various content receivers. The controller 204 references the local license database 260 to control access to the programs stored on the program store 208. Use of the licenses may be reported to the headend or other location maintaining a content license database 148.

Figure 2B:
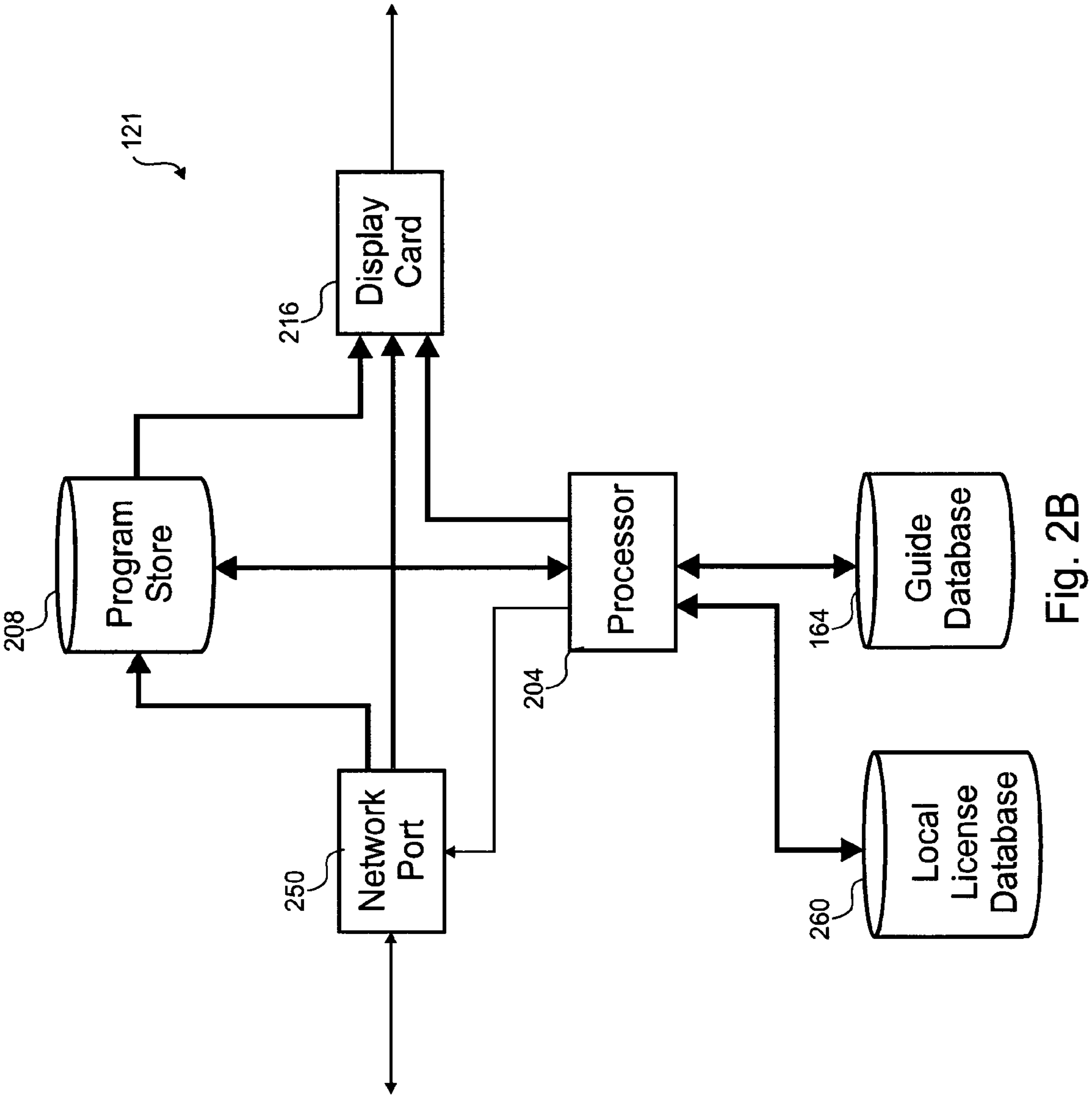

With reference to FIG. 2B, a block diagram illustrating an embodiment of a PC content receiver 121 is shown. A general purpose processor 204 manages storage, playback and control of video content stored in the program store 208. Content is downloaded through a network port 250 coupled to the headend 124. Local license and guide databases 260, 164 are maintained and reconciled where appropriate. A display card 216 is used to produce a video image for the viewer.

Figure 2C:
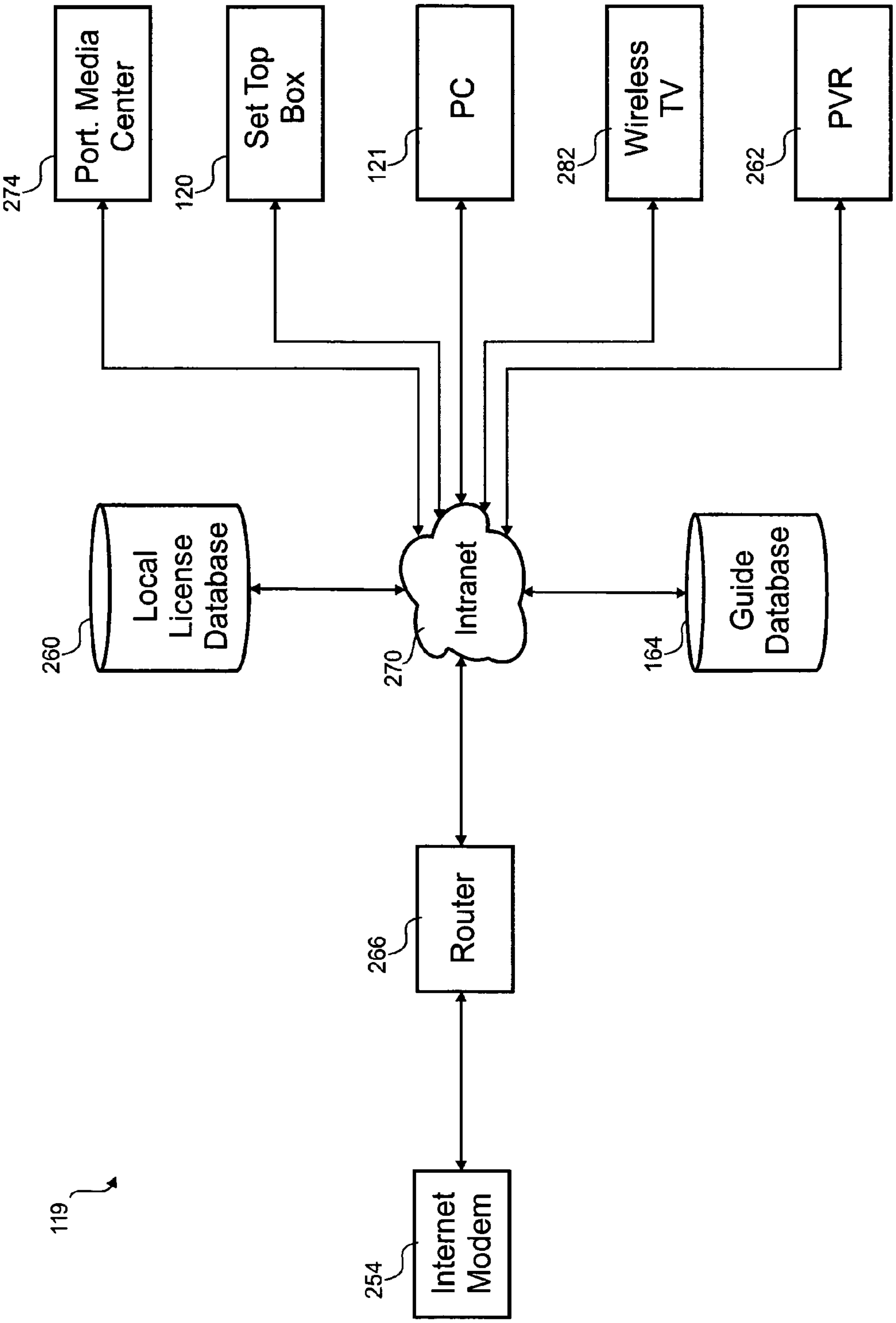

Referring next to FIG. 2C, a block diagram illustrating an embodiment of a CPE type content receiver 119 is shown. In this embodiment, an intranet 270 connects a number of content receivers to a router 266 and an Internet modem 254 to the headend 124 by way of a WAN or the Internet. A local license database 260 and guide database 164 are maintained and accessible to all the content receivers. Each content receiver may replicate the information in these databases 260, 164.

There are five different types of content receivers in this embodiment. Other embodiments could have more than one of each type of content receiver. This embodiment includes a PVR 262, a wireless TV 282, a PC 121, a set top box 120, a portable media player 274. All these content receivers could use the licenses and would report usage to the local license database 260.

Figure 2D:
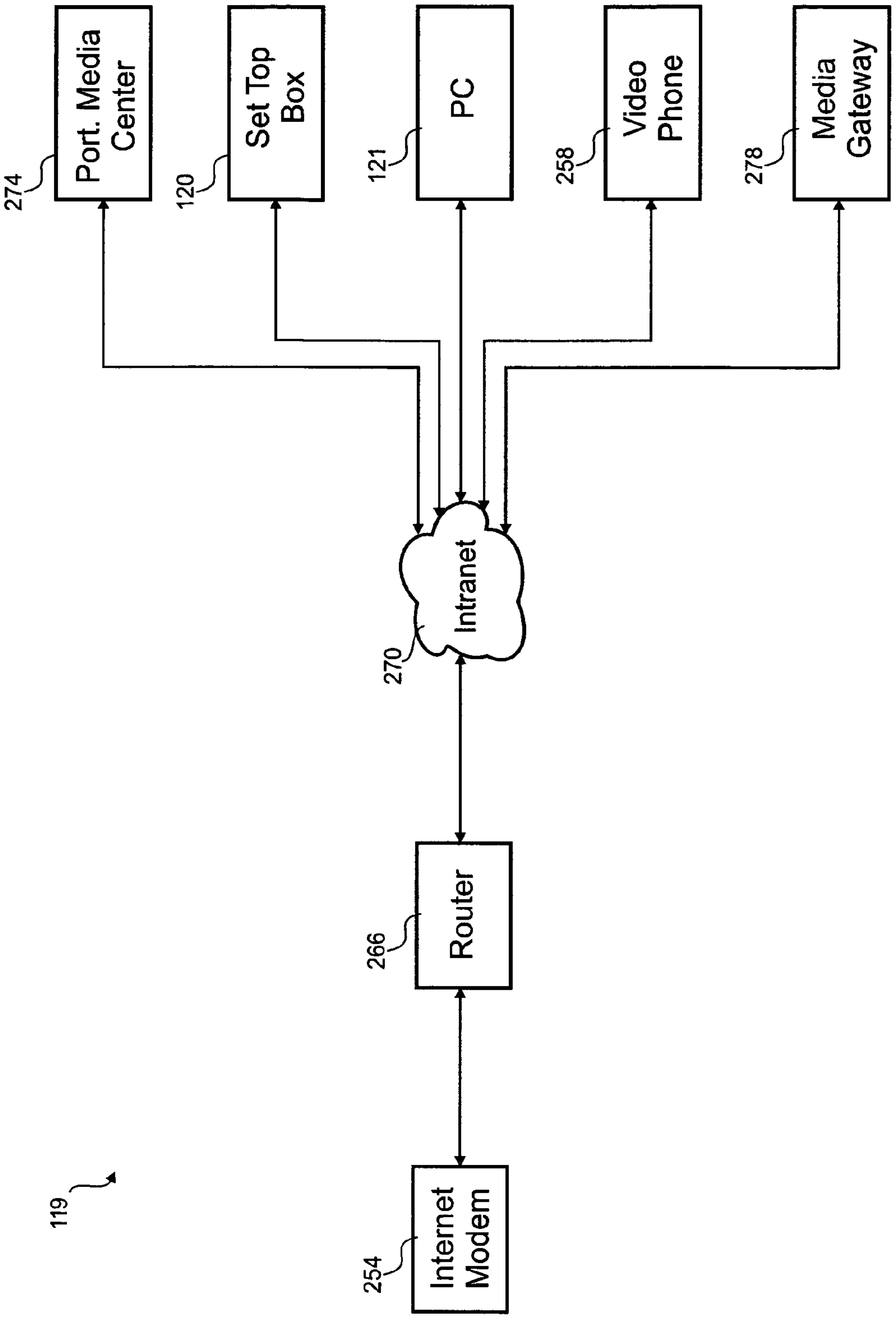

With reference to FIG. 2D, a block diagram illustrating another embodiment of a CPE type content receiver 119 is shown. This embodiment refers to a remote content license database 148 to get authorization and use of a license. Guide information is provided from a remote guide database 164. Alternatively, one of the content receivers could maintain the local license database 260 and/or guide database 164 and provide the information to the other content receivers. This embodiment includes a video phone 258 and a media gateway 278 as possible content receivers.

Figure 2E:
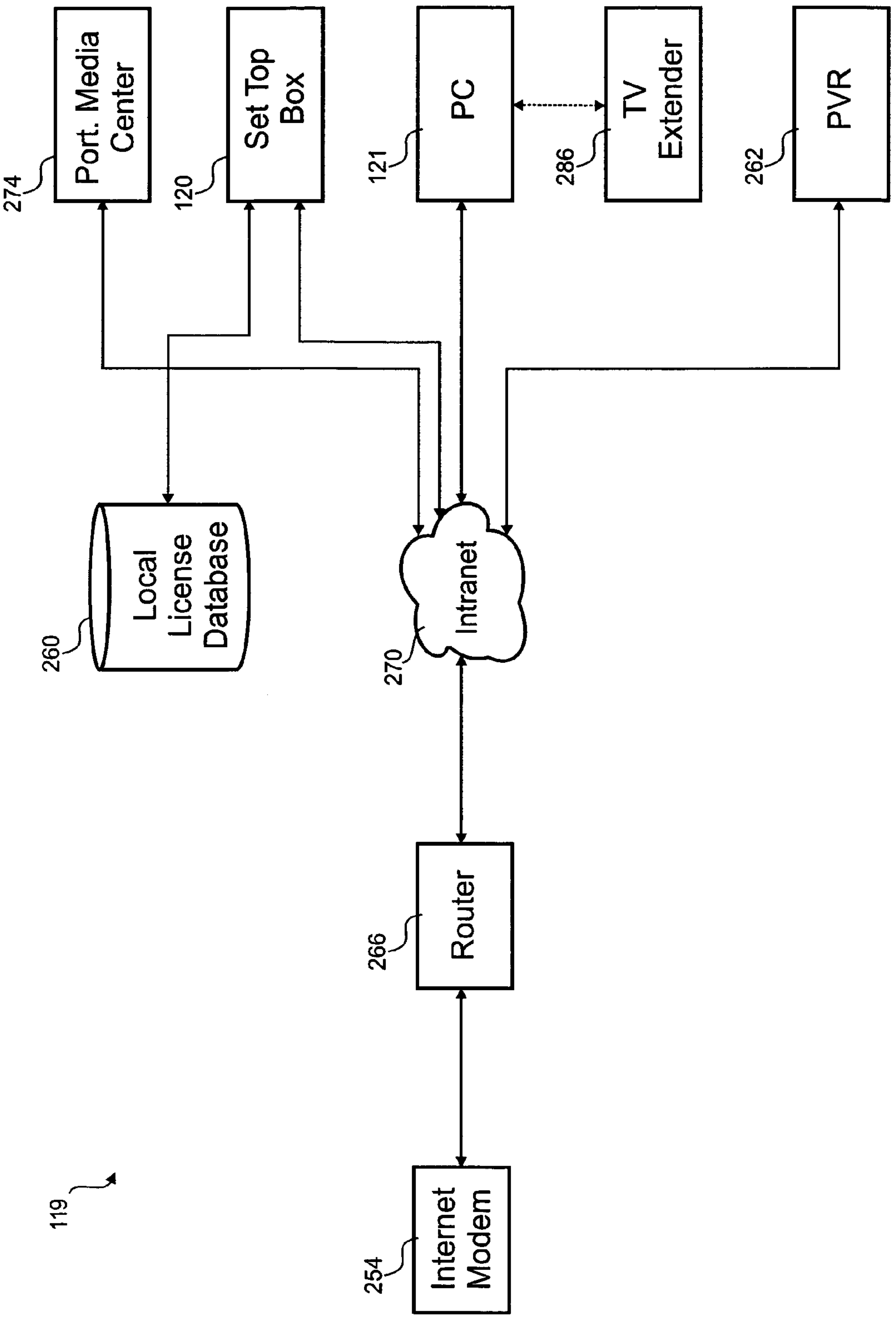

Referring next to FIG. 2E, a block diagram illustrating yet another embodiment of a CPE type content receiver 119 is shown. In this embodiment, the local license database is maintained by a step top box 120. Other content receivers that want a license can request one from the set top box 120. This embodiment includes a TV extender 286 wirelessly coupled to the PC 121. Programs played by the PC can be watched on a conventional TV anywhere within communication range.

Figure 3:
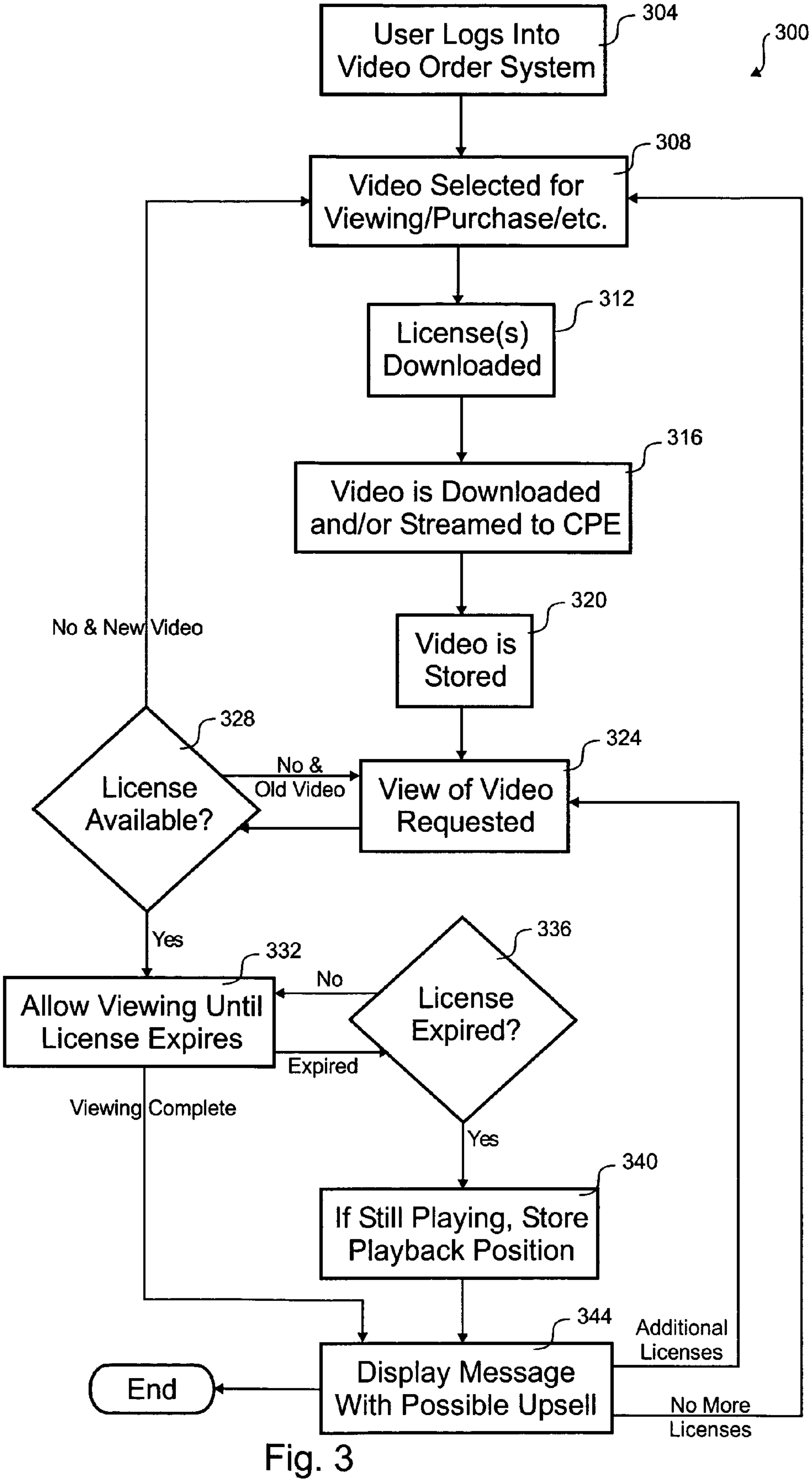
FIG. 3 is a flow diagram of an embodiment of a process for using licensed video content.

With reference to FIG. 3, a flow diagram of an embodiment of a process 300 for using licensed video content is shown. The depicted portion of the process begins in step 304 where the viewer logs into the video order system 304. Some content receivers are self-authenticating such that a login is not required. The user navigates menus in step 308 to select a video for viewing. The user may select a number of programs for download now, later, when bandwidth is available or when the video is available. Some embodiments download programs and licenses automatically such that selection is not required except to indicate which program should start playing.

In the depicted embodiment, licenses are downloaded to the content receiver in step 312 or the licenses are downloaded to a local or remote license database 148, 260 accessible to the content receiver. The program is downloaded in step 316. Some embodiments allow playback during the download. The license indicates if streaming or stored playback are included. The downloaded video is stored in step 320, which may occur in a piecemeal fashion as the portions are received.

The viewer requests playback of the video program in step 324. A check for an available license is performed in step 328. Where the licenses are expired or used, processing loops back to step 308 where the user can request a new video or processing can loop back to step 324 where another stored video is selected. Some embodiments remove the program from the guide of possible videos to view once the licenses are expired.

Where licenses are available, processing continues from step 328 to step 332 to allow viewing until the license expires or viewing ends. The content receiver manages license compliance to enforce license terms. If the license expires in step 336, processing continues to step 340 where the playback position is stored. A message is displayed in step 344 that allows ending the viewing, using additional licenses for the program or another program in step 424, or selecting additional programs in step 308. The message displays the additional license(s) as a possible selection. Some embodiments allow purchase of additional licenses, burning the program to an optical disk or other media, purchase of the copy, ordering the program for physical delivery or other up-sales.

When switching to a new license in step 344, the playback position is remembered from the interrupted playback. This playback position is maintained even if the downloaded copy is deleted and downloaded again. For example, the window for a movie may prevent further viewing that month. A few months later when the movie is available for download again, the user can choose to resume where interrupted previously.

Some embodiments automatically transition to the new license without pausing. A warning message may appear in some embodiments allowing the viewer to avoid the automatic switchover to the new license. A count-down timer could indicate when the license switchover would occur. The new license could be automatically secured from the remote or local license database 148, 260.

While the principles of the disclosure have been described above in connection with specific apparatuses and methods, it is to be clearly understood that this description is made only by way of example and not as limitation on the scope of the invention.

What is claimed is:

1. A method for managing licensed videos, the method comprising steps of:

relaying selection of a video;

receiving a plurality of content licenses for the video, wherein:

the plurality of content licenses is comprised of at least a first content license and a second content license, the first content license has a first time period where viewing is allowed, the first time period indicating a duration after which the first content license expires, the second content license has a second time period where viewing is allowed, the second time period indicating a duration after which the second content license expires, and the first time period is different from the second time period;

controlling access to the video according to the plurality of content licenses for the video;

authorizing access to view the video according to the first content license until the first content license expires;

when the first content license expires, determining a playback position indicating a last-viewed position in the video upon expiration of the first time period;

storing the playback position in association with the second content license;

receiving a request for the video after the first content license expires; and in response to receiving the request for the video after the first content license expires, authorizing access to continue viewing the video at the stored playback position according to the second content license until the second content license expires.

2. The method for managing licensed videos as recited in claim 1, wherein:

the first content license allows viewing a first portion of the video, the second content license allows viewing a second portion of the video, the first portion is different from the second portion, and the first portion may partially overlap with the second portion.

3. The method for managing licensed videos as recited in claim 1, wherein:

the first content license allows viewing a first portion of the video, the second content license allows viewing a second portion of the video, and the first portion is different from the second portion.

4. The method for managing licensed videos as recited in claim 1, wherein at least one of the first or second time period begins when the video becomes available for viewing.

5. The method for managing licensed videos as recited in claim 1, wherein the first time period begins when use of the first content license begins.

6. The method for managing licensed videos as recited in claim 1, further comprising a step of displaying a message that a current license is about to expire.

7. A computer-readable medium having computer-executable instructions for performing the computer-implementable method for managing licensed videos of claim 1.

8. A computer system adapted to perform the computer-implementable method for managing licensed videos of claim 1.

9. A video system for playing licensed video content, the video system comprising:

a video;

a video selection interface for selecting the video;

a video storage device for storing a plurality of videos locally to the viewer, wherein the plurality of videos includes the video;

a plurality of content licenses for the video, wherein:

the plurality of content licenses is comprised of at least a first content license and a second content license, the first content license has a first time period where viewing is allowed, the first time period indicating a duration after which the first content license expires, and the first time period is different from the second time period;

a license control process for enforcing the content licenses; and a position recorded for determining and storing a playback position when the first content license expires, the stored playback position indicating a last-viewed position in the video upon expiration of the first time period and being stored in association with the second content license substantially upon receipt of a request for the video after expiration of the first time period.

10. The video system for playing licensed video content as recited in claim 9, wherein the license control process is managed by software.

11. The video system for playing licensed video content as recited in claim 9, wherein the video is part of a plurality of videos that are purchased as a package.

12. The video system for playing licensed video content as recited in claim 9, wherein the video storage device allows access to any portion of the plurality of videos in less than ten seconds.

13. The video system for playing licensed video content as recited in claim 9, wherein:

the first content license allows viewing a first portion of the video, the second content license allows viewing a second portion of the video, and the first portion is different from the second portion.

14. The video system for playing licensed video content as recited in claim 9, wherein at least one of the first or second time period begins when the video becomes available for viewing.

15. The video system for playing licensed video content as recited in claim 9, wherein the first time period begins when use of the first content license begins.

16. A method for managing licensed content, the method comprising steps of:

relaying selection of a content object;

receiving the content object;

receiving a plurality of content licenses for the content object, wherein:

the plurality of content licenses is comprised of a first content license and a second content license, the first content license having a first time period where viewing is allowed, the first time period indicating a duration after which the first content license expires;

controlling access to the content object according to the plurality of content licenses for the content object;

authorizing access to view the video according to the first content license until the first content license expires;

when the first content license expires, determining a playback position indicating a last-viewed position in the video upon expiration of the first time period;

receiving a request for the video after the first content license expires; and storing the playback position in association with the second content license substantially upon receiving the request for the video after the first content license expires.

17. The method for managing licensed content as recited in claim 16, wherein the content object is comprised of video content.

18. The method for managing licensed content as recited in claim 16, further comprising a step of authorizing access to continue viewing the video at the stored playback position according to the second content license until the second content license expires.

19. The method for managing licensed content as recited in claim 16, further comprising a step of displaying a message that a current license is about to expire.

20. The method for managing licensed content as recited in claim 16, further comprising a step of displaying a message that a new license is available when a current license is about to expire.

21. A computer-readable medium having computer-executable instructions for performing the computer-implementable method for managing licensed content of claim 16.

22. A computer system adapted to perform the computer-implementable method for managing licensed content of claim 16.

* * * * *

UNITED STATES PATENT AND TRADEMARK OFFICE

CERTIFICATE OF CORRECTION

PATENT NO. : 7,587,766 B2
APPLICATION NO. : 10/993140
DATED : September 8, 2009
INVENTOR(S) : Greene et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1174 days.

Signed and Sealed this

Twenty-first Day of September, 2010

David J. Kappos
*Director of the United States Patent and Trademark Office*